United States Patent [19]

Bowman et al.

[11] Patent Number: 4,675,569

[45] Date of Patent: Jun. 23, 1987

[54] TOUCH SCREEN MOUNTING ASSEMBLY

[75] Inventors: Charles H. Bowman, Raleigh; Jeffrey A. Farringer, Cary, both of N.C.; Richard L. Garwin, Scarsdale, N.Y.; Larry L. Greene, Cary, N.C.; James L. Levine, Yorktown Heights, N.Y.; Anthony W. Miles; Kevin H. Vorhees, both of Raleigh, N.C.

[73] Assignee: International Business Machines Corporation, Armonk, N.Y.

[21] Appl. No.: 892,632

[22] Filed: Aug. 4, 1986

[51] Int. Cl.⁴ .............................................. H01L 41/08
[52] U.S. Cl. .................................... 310/328; 310/339; 178/18; 340/712
[58] Field of Search ............... 310/328, 338, 339, 311; 340/706, 712, 365 A, 365 P; 178/18; 358/247, 255, 246; 315/3; 313/364; 411/924, 946, 231, 929.1; 200/159 B, 5 A

[56] References Cited

U.S. PATENT DOCUMENTS

| 4,268,826 | 5/1981 | Scott et al. | 178/18 X |
| 4,303,914 | 12/1981 | Page | 310/311 |
| 4,340,777 | 7/1982 | De Costa et al. | 178/18 |
| 4,516,112 | 5/1985 | Chen | 310/339 X |
| 4,553,142 | 11/1985 | Strauss | 340/712 |

Primary Examiner—Mark O. Budd
Attorney, Agent, or Firm—Gerald R. Woods

[57] ABSTRACT

A piezoelectric touch screen assembly can be attached to mounting ears on an ordinary CRT assembly. The touch screen assembly includes a frame, a glass plate which is seated on a gasket at one surface of the frame and a plurality of piezoelectric elements which are bonded to the glass plate and are "trapped" between the CRT face and the glass plate. Studs extend outwardly from the CRT ears through openings in the frame. Coil springs are placed on the studs and are trapped by washer nuts to load the touch screen assembly toward the CRT by a predetermined amount. Grommets with a unique cross sectional configuration are mounted at the openings through the frame. The grommet is designed to provide minimal resistance to movement of the touch screen assembly toward or away from the CRT face but greater resistance to movement of the assembly in other directions.

6 Claims, 4 Drawing Figures

TOUCH SCREEN MOUNTING ASSEMBLY

TECHNICAL FIELD

The present invention relates to touch input displays and more particularly to a mounting assembly for attaching a force sensitive touch screen to a video display, such as a cathode ray tube or CRT.

BACKGROUND FO THE INVENTION

A touch sensitive display typically includes a cathode ray tube monitor and a transparent, touch sensitive overlay which is attached to the face of the monitor. Such displays are usually part of a system including a small processor, such as a personal computer, and a source of external video, such as a video disk player or a video cassette recorder.

To use a touch sensitive display for a particular purpose, a program is written for execution in the processor. The program defines the response of the system whenever the screen is touched at a particular point. Depending on the program, a screen touch may cause video information to be retrieved from the external video source for display on the screen, either alone or in combination with graphics information generated by the processor. A screen touch may also result in the display of graphics information only.

Touch sensitive displays are not per se new. Such displays have been implemented using a number of different technologies. In one known technology, transparent conductors are formed in two slightly separated layers of transparent, flexible material. By "scanning" the conductors in one of the layers with sequenced voltage pulses and by noting at which conductor in the other layer on which the voltage appears, the horizontal (X) and vertical (Y) coordinates of the touched location can be determined. The X-Y coordinates represent a user response which is employed by the processor to determine the next system action.

Another technology used for touch input displays also has two slightly separated flexible layers but measures the capacitance at particular points on the touch sensitive surface. If one of the layers is touched, bringing two spaced conductors closer together, the capacitance will change at the touched location.

Another technology which has been suggested for touch input displays requires that a transparent, substantially rigid push plate be supported primarily by at least three force sensitive transducers, such as piezoelectric transducers. When the push plate is touched, the almost imperceptible movement of the push plate towards the CRT will exert pressure on the piezoelectric transducers, causing each to generate an electrical signal having a level proportional to the amount of force exerted on the transducer. By comparing the relative forces exerted on the various transducers, the location at which the screen was touched can be determined mathematically. Piezoelectric touch screens are considered to be less expensive to manufacture and yet more durable in normal use than other known types of touch screens.

The mechanical requirements for a piezoelectric touch screen display are not, however, simple. The piezoelectric transducers must be incorporated into an assembly which is substantial enough to maintain the alignment of the touch screen components relative to the face of the CRT. The assembly must also be substantial enough to withstand the repeated pushes which will occur as part of the normal system operation.

At the same time, the mounting assembly must not itself inhibit the movement of the push plate toward or away from the face of the CRT.

SUMMARY OF THE INVENTION

The present invention is a mounting assembly for a piezoelectric touch screen which will minimize resistance to movement of a push plate toward or away from the face of a CRT while resisting shifting of the push plate in any plane parallel to the face of the CRT.

The assembly is used to attach the touch screen to a CRT assembly having a plurality of outwardly extending ears, which are standard for most CRTs. The assembly comprises a touch screen assembly including a frame having openings which can be aligned with the CRT ears. Deformable members are received in the openings in the frame. A rigid transparent plate is seated against the surface of the frame facing the CRT. A plurality of force sensitive transducers are "trapped" between the plate and the CRT face. Means for securing the touch screen assembly to the CRT ears include a plurality of studs, each of which is attached at one end to one of the CRT ears. Each of the studs includes a post portion which extends through one of the openings in the frame. Coil springs are placed over the posts and held in place by fasteners which are attached to the outer ends of the posts. The fasteners compress the coil springs to bias the touch screen assembly toward the CRT, thereby providing loading of the "trapped" force sensitive transducers.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
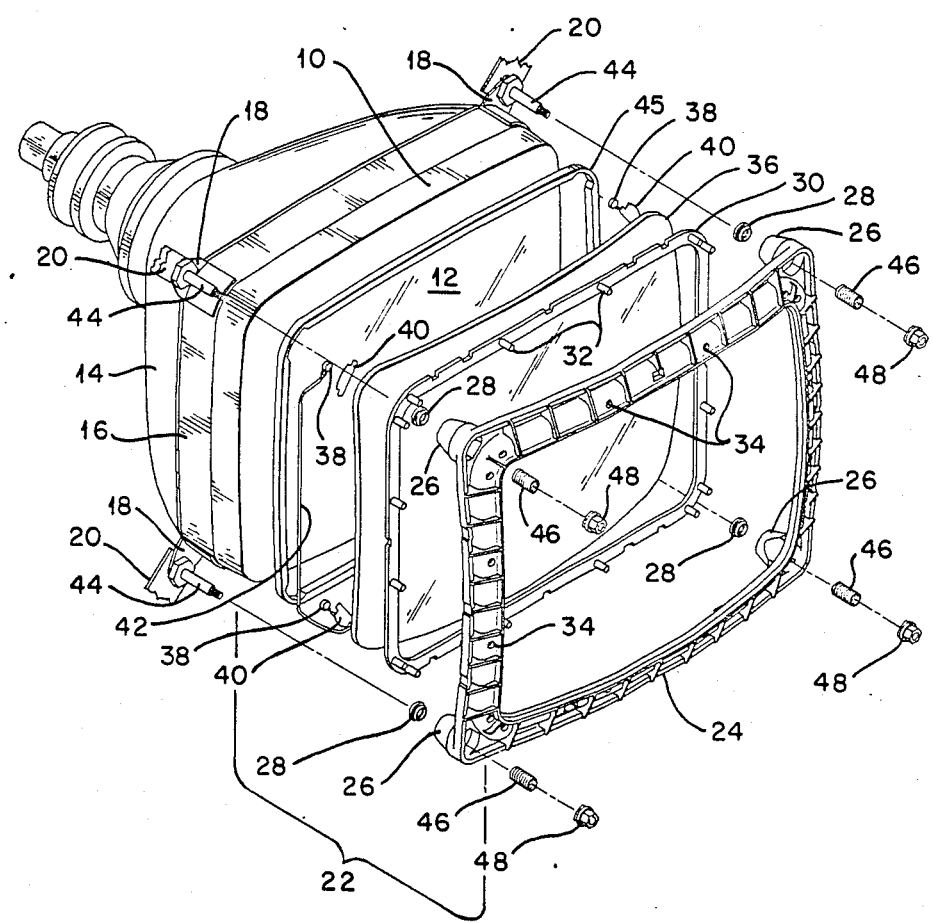
FIG. 1 is an exploded, perspective view of a touch input device constructed in accordance with the present invention.

Turning to FIG. 1, a touch screen constructed in accordance with the present invention is attached to a conventional cathode ray tube or CRT 10 having a face 12 and a housing 14. A metal band 16 secured to housing 14 includes mounting ears 18 at each of its four corners. In a conventional monitor or receiver, the ears 18 are used to bolt the cathode ray tube to a chassis (not shown) having inwardly extending tabs 20, each of which has an opening which can be aligned with an opening through one of the ears 18.

In accordance with the present invention, the chassis tabs 20 and the CRT ears 18 are used to secure a touch screen assembly 22 to the CRT 10. The touch screen assembly 22 includes a frame 24 having integral cones 26 which extend toward the CRT 10 at each of the four corners of the frame. The cones 26 have openings therethrough which can be aligned with the openings in the CRT ears 18 and chassis tabs 20. Deformable grommets 28 are mounted in the openings of the cones 26. The grommets 28, which will be described in more detail later, extend toward CRT 10.

A rubber gasket 30 is seated against the surface of the frame 24 and is held in place by a plurality of integral pins 32 which fit into matching openings 34 in the frame 24. A rigid transparent plate 36, preferably made of glass, is seated against the rubber gasket 30 in a recess on the surface of frame 24. The rigid transparent plate 36 may also be described as a push plate since a user will tap or touch this plate during system operation. The curvature of the plate 36 and the curvature of the frame 24 generally match the curvature of the face 12 of CRT 10.

In a preferred embodiment of the invention, force-sensitive or piezoelectric transducers 38 are attached to one surface of the plate 36 using tabs 40 having layers of adhesive on both surfaces. The piezoelectric transducers 38 preferably include a domed surface facing the CRT face 12 to provide a point contact between each piezoelectric transducer and the face 12 at all times. Each of the piezoelectric transducers 38 is coupled to a connector (not shown) by a conductor, such as wire 42. The current produced by each of the piezoelectric transducers 38 is proportional to the force exerted on the transducer. The techniques employed for processing the piezoelectric signals to determine where the push plate was touched are beyond the scope of this invention. One example of a technique that might be used is taught in U.S. Pat. No. 4,511,760, which is assigned to the assignee of the present invention. The touch screen assembly further includes a flexible, dust impervious continuous member 45 which is attached to the perimeter of the push plate 36, using a suitable adhesive. When the assembly is completed, the member 45 provides a dust seal between the CRT face 12 and the push plate 36 to minimize the amount of dust that is attracted to the face 12 during normal CRT operation.

The touch screen mounting assembly is secured to the CRT ears 18 and chassis tabs 20 by means of studs 44 having threads at both ends. The threads at the first end mate with internal threads in the chassis tabs 20. The studs extend through the openings in the cones 26 and are encircled by coil springs 46. The coil springs 46 are held in place by fastening elements or washer nuts 48 as will be explained in more detail below. The studs 44 are constructed to provide a controlled amount of loading or compression of the entire touch screen assembly.

Figure 2:
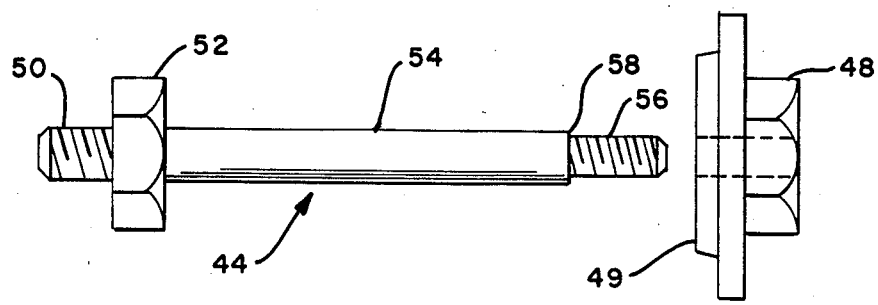
FIG. 2 is a plan view of one of the studs and washer nuts used to attach a touch screen assembly to the CRT.

FIG. 2 is a plan view of one of the studs 44 and washer nuts 48. Each stud 44 includes a first threaded portion 50 which is used to attach the stud to a chassis tab 20. The stud 44 includes an integral nut 52 and a shank 54 terminating in a second threaded portion 56 and a raised annular shoulder 49. The outer diameter of the second threaded portion 56 is smaller than the outer diameter of shank 54. The washer nut 48 includes internal threads which mate with the threads of threaded portion 56. Since the outer diameter of the threaded portion 56 is smaller than the diameter of shank 54, washer nut 48 can be threaded onto stud 44 only until it contacts the shoulder 58 between shank 54 and threads 56. The shoulder 49 has an outside diameter which is slightly smaller than the inside diameter of the coil spring. Shoulder 49 serves to center the coil spring relative to the stud 44.

Figure 3:
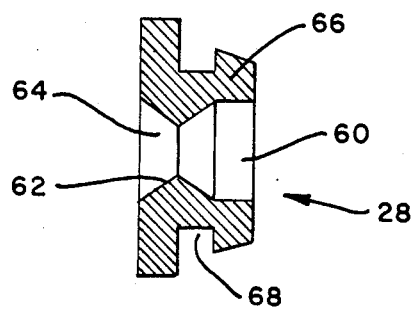
FIG. 3 is a cross sectional view of one of four deformable grommets which are used in the device shown in FIG. 1.

FIG. 3 shows a cross sectional view of one of the grommets 28. The grommet 28 has an opening 60 which is generally larger than the outside diameter of the shank 54 on stud 44. The grommet material includes an inwardly extending shoulder 62, however, which reduces the size of the opening 60 at point 64 to approximately the diameter of shank 54. The shoulder 62 permits the grommet 28 to be placed on shank 54 with the only contact between grommet 28 and shank 54 being along the line at point 64. The grommet includes relatively thick walls 66 which resist deformation in any plane orthogonal to the axis of the opening 60. The grommet 28 includes an external groove 68 which is used to seat the grommet in one of the cones 26.

Figure 4:
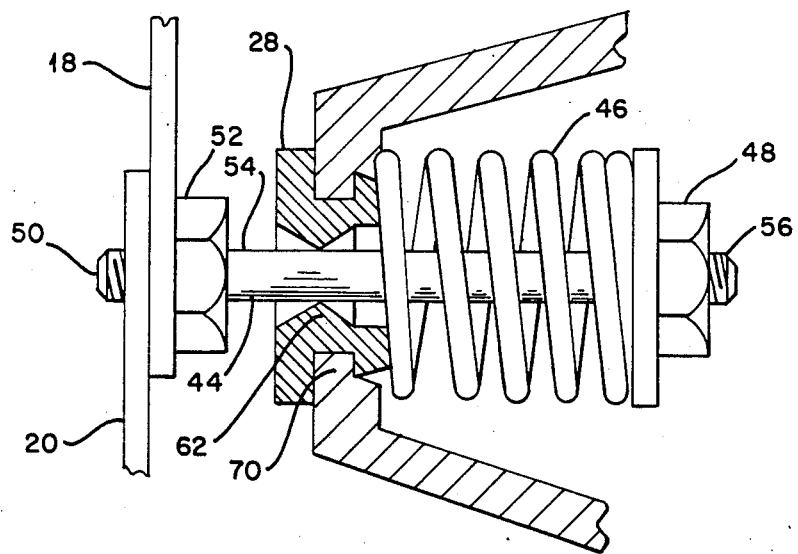
FIG. 4 is a partial cross sectional view at the point of attachment between the CRT and the touch screen assembly.

FIG. 4 is a partial cross sectional view showing a completed attachment assembly. The attachment of a stud 44 to a chassis tab 20 is shown as is the placement of a grommet 28 at the tip of a cone 26. It can be seen clearly that external groove 68 in each grommet 28 receives an inwardly extending flange 70 at the tip of cone 26. The figure also shows the line contact between the shank 54 and the peak of shoulder 62 of the grommet. The washer nut 48 traps coil spring 46. Since washer nut 48 can only be threaded onto stud 44 to the shoulder 58, it can compress the coil spring 46 only to a known, predetermined extent. The compression of the coil spring 46 provides a force which biases the frame 24, of which cone 26 is an integral part, and thus the entire touch screen assembly, toward the face 12 of CRT 10. This provides loading on each of the piezoelectric transducers 38 trapped between the face 12 and push plate 36 (not shown in FIG. 4).

In the completed assembly, the relatively thick annular walls of each grommet 28 resist displacement of the touch screen assembly in a plane orthogonal to the axis of stud 44. Such a plane is generally parallel to the central surface of face 12. However, the line contact between the inwardly extending shoulder 62 of grommet 28 and the surface of shank 54 minimizes any resistance to movement of the touch screen assembly along the axis of shank 54. The low resistance to movement along the axis of shank 54 assures that there will be minimal distortion of any force readings due to any binding of the touch screen assembly as it is pushed toward the CRT face.

While there has been described what is considered to be a preferred embodiment of the invention, variations and modifications in that embodiment will occur to those skilled in the art once they learn of the invention through this technical description. Therefore, it is intended that the appended claims shall be construed to include not only the preferred embodiment but all such variations and modifications as would occur to those skilled in the art.

We claim:

1. For use in attaching a touch screen to a video display having a plurality of outwardly extending mounting ears, an assembly comprising:
   a touch screen assembly including a frame having openings which can be aligned with the mounting ears, deformable members received in the openings, and a rigid transparent plate seated against the surface of the frame facing the display, said plate having a plurality of force sensitive-transducers mounted on the plate surface facing the display;

means for securing the touch screen assembly to the display comprising a plurality of studs, each having an end portion which can be secured to one of the mounting ears and a post portion which extends through one of the openings in said frame, and means for holding the frame on the posts, said holding means comprising a plurality of coil springs and a plurality of fastening elements which are attached to the distal ends of the posts to trap the coil springs on the posts, said fastening elements being adapted to compress the coil springs to bias the touch screen assembly toward the display.

2. An assembly as described in claim 1 wherein each of the deformable members in said touch screen assembly comprises a grommet having an opening therethrough which is larger than the outside diameter of the posts of said securing means over a substantial portion of the length of the grommet and a short inwardly extending shoulder which limits contact between the grommet and the post to minimize resistance to movement of the touch screen assembly toward the display, each of said grommets also having relatively thick walls which resist movement of the touch screen assembly in directions parallel to the face of the display.

3. An assembly as defined in claim 2 wherein said post member further comprises a first threaded portion for use in attaching the post member at the mounting ears, an integral nut coaxial with the threaded portion for use in making such attachment, an elongated shank extending from the integral nut and a second threaded portion, said second threaded portion having an inside diameter less than the diameter of the shank to limit the movement of the fastening element which is threaded onto the distal end of the post member.

4. An assembly as defined in claim 3 wherein each grommet further includes an external groove for receiving an inwardly extending flange at the surface of each opening in the molded ring, said groove and flange cooperating to retain the grommet once it has been inserted, and wherein the shoulder portion of said grommet has a substantially triangular cross section such that the shoulder makes line contact with the surface of the shank.

5. An assembly as defined in claim 4 further including a rubber gasket interposed between the rigid transparent plate and the frame, said gasket including a plurality of integral pins which are received in complementary openings in the frame to maintain the gasket in place relative to the frame.

6. An assembly as defined in claim 5 further including a flexible, dust-impervious continuous member which is adhered to one surface of the rigid transparent plate to provide a dust seal between the transparent plate and the face of the display.

* * * * *